United States Patent
Deutschle et al.

(10) Patent No.: US 9,262,626 B2
(45) Date of Patent: *Feb. 16, 2016

(54) STACK ENTRY OVERWRITE PROTECTION

(71) Applicant: International Business Machines Corporation, Armonk, NY (US)

(72) Inventors: Joerg Deutschle, Winnenden (DE); Wolfgang Gellerich, Boeblingen (DE); Bernhard Kick, Waldenbuch (DE); Gerrit Koch, Ammerbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/307,527

(22) Filed: Jun. 18, 2014

(65) Prior Publication Data

US 2015/0169869 A1   Jun. 18, 2015

Related U.S. Application Data

(63) Continuation of application No. 14/108,418, filed on Dec. 17, 2013.

(51) Int. Cl.
*G06F 11/00* (2006.01)
*G06F 21/52* (2013.01)

(52) U.S. Cl.
CPC ..................................... *G06F 21/52* (2013.01)

(58) Field of Classification Search
CPC ....................................................... G06F 21/52
USPC ......................................................... 726/22
See application file for complete search history.

(56) References Cited

U.S. PATENT DOCUMENTS

| 4,038,645 | A |   | 7/1977 | Birney et al. |
| 6,081,665 | A | * | 6/2000 | Nilsen .................. G06F 9/45504 711/E12.011 |
| 7,434,020 | B2 |  | 10/2008 | Swafford et al. |
| 7,581,089 | B1 |  | 8/2009 | White |
| 7,594,111 | B2 |  | 9/2009 | Kiriansky et al. |
| 7,660,985 | B2 |  | 2/2010 | Asher et al. |
| 7,716,495 | B2 |  | 5/2010 | Shupak et al. |

(Continued)

FOREIGN PATENT DOCUMENTS

| CN | 1991852 A | 7/2007 |
| CN | 101350051 A | 1/2009 |
| EP | 2256659 A1 | 12/2010 |

OTHER PUBLICATIONS

Aho et al. "Compilers Principles, Techniques, and Tools", Addison-Wesley Publishing Company. CA, Reprinted with corrections Mar. 1998.

(Continued)

*Primary Examiner* — Peter Shaw
(74) *Attorney, Agent, or Firm* — David M. Quinn (57) ABSTRACT

A computer processor receives a plurality of execution items corresponding to a computer process. The computer processor allocates a first memory portion corresponding to a first stack, wherein the first stack corresponds to a first class of execution items. The computer processor allocates a second memory portion corresponding to a second stack, wherein the second stack corresponds to a second class of execution items. The computer processor identifies a first execution item of the plurality of execution items and determining a class corresponding to the first execution item.

7 Claims, 4 Drawing Sheets

(56) References Cited

U.S. PATENT DOCUMENTS

| | | | |
|---|---|---|---|
| 7,752,459 | B2 | 7/2010 | Cowan et al. |
| 7,814,333 | B2 | 10/2010 | Choi et al. |
| 7,853,803 | B2 | 12/2010 | Milliken |
| 7,958,554 | B2 | 6/2011 | Chow et al. |
| 7,971,255 | B1 | 6/2011 | Kc et al. |
| 8,042,179 | B2 | 10/2011 | Shoji et al. |
| 8,074,115 | B2 | 12/2011 | Stolfo et al. |
| 8,196,110 | B2 | 6/2012 | Cabrera Escandell et al. |
| 8,239,836 | B1 | 8/2012 | Franz et al. |
| 8,261,065 | B2 | 9/2012 | Savagaonkar et al. |
| 2009/0187748 | A1 | 7/2009 | Krig |
| 2011/0261964 | A1* | 10/2011 | Kahler et al. ............ 380/286 |

OTHER PUBLICATIONS

Du, J. And Mai, J. "A New Approach against Stack Overrun: Separates the stack to two parts", 2011 International Conference on Instrumentation, Measurement, Computer, Communication and Control, pp. 441-444, Copyright 2011 IEEE.

Dusty, "Vulnerability Development: Buffer Overflows: How to Bypass ASLR . . . | Pentura Labs's Blog", Mar. 31, 2011, [online] [retrieved on: Sep. 25, 2013], <http://penturalabs.wordpress.com/2011/03/31/vulnerability-development-buffer-overflows-how-to-bypass-full-aslr/>.

Francillon A. et al., "Defending Embedded Systems Against Control Flow Attacks", SecuCode '09, Nov. 9, 2009, Copyright 2009, ACM, USA.

Guillaume, "Bypassing ASLR and DEP on Adobe Reader X—Sogeti ESEC Lab", Jun. 22, 2012, [online] [retrieved on: Sep. 25, 2013], <http://esec-lab.sogeti.com/post/Bypassing-ASLR-and-DEP-on-Adobe-Reader-X>.

Payer, "String Oriented Programming", Circumventing ASLR, DEP, and Other Guards, Dec. 21, 2011, pp. 1-5.

Roth, B. and Spafford E.H., "Implicit Buffer Overflow Protection Using Memory Segregation", 2011 Sixth International Conference on Availability, Reliability and Security (ARES), 2011, pp. 1-7.

Stallman, R.M., "Using the GNU Compiler Collection", for GCC Version 4.7.3, pp. 127.

"Call stack—Wikipedia, the free encyclopedia", last modified on Jul. 22, 2013, <http://en.wikipedia.org/wiki/Call_stack>.

"Data Execution Prevention—Wikipedia, the free encyclopedia", last modified on Jul. 24, 2013, <http://en.wikipedia.org/wiki/Data_Execution_Prevention>.

"Return-oriented programming—Wikipedia, the free encyclopedia", last modified on Aug. 17, 2013, <http://en.wikipedia.org/wiki/Return-oriented_programming>.

"Stack buffer overflow—Wikipedia, the free encyclopedia", last modified on Sep. 25, 2013, <http://en.wikipedia.org/wiki/Stack_buffer_overflow>.

"Stapelspeicher—Wikipedia", last modified on Aug. 27, 2013, <http://de.wikipedia.org/wiki/Stapelspeicher>.

U.S. Appl. No. 14/108,418, entitled "Stack Entry Overwrite Protection" filed Dec. 17, 2013.

* cited by examiner

STACK ENTRY OVERWRITE PROTECTION

FIELD OF THE INVENTION

The present invention relates generally to the field of data security, and more particularly to stack entry overwrite protection.

BACKGROUND OF THE INVENTION

Many programming languages employ a stack to manage data during program execution time. Such languages include languages like C, C++, and Java® (note: the term(s) "Java" and the like may be subject to trademark rights in various jurisdictions throughout the world and are used here only in reference to the products or services properly denominated by the marks to the extent that such trademark rights may exist). A stack is used to store and manage data associated with subroutine calls, which may also be called procedures, functions, or methods, depending on the programming language. In response to such a call, the stack stores information. For example, the stack can store a return address, which is a memory address at which to resume program execution in response to completion of the call. The stack can store data which is extendable or non-extendable in length.

A stack overflow is a computer security attack which occurs when a program writes to a memory address on the program's stack outside of the intended data structure. A stack overflow attack can involve writing data beyond the portion of the stack in which an extendable length data value is stored, thus overwriting adjacent data. Such an attack can function to overwrite the function return address with a pointer to attacker-controlled data or code.

SUMMARY

Embodiments of the present invention provide a method, computer program product, and system for executing a computer process. A computer processor receives a plurality of execution items corresponding to the computer process. The computer processor allocates a first memory portion corresponding to a first stack, wherein the first stack corresponds to a first class of execution items. The computer processor allocates a second memory portion corresponding to a second stack, wherein the second stack corresponds to a second class of execution items. The computer processor identifies a first execution item of the plurality of execution items and determines a class corresponding to the first execution item.

DETAILED DESCRIPTION

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. The term "computer-readable storage media" does not include computer-readable signal media.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java®, Smalltalk® (note: the term(s) "Java", "Smalltalk" and the like may be subject to trademark rights in various jurisdictions throughout the world and are used here only in reference to the products or services properly denominated by the marks to the extent that such trademark rights may exist), C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

The present disclosure will now be described in detail with reference to the Figures.

Figure 1:
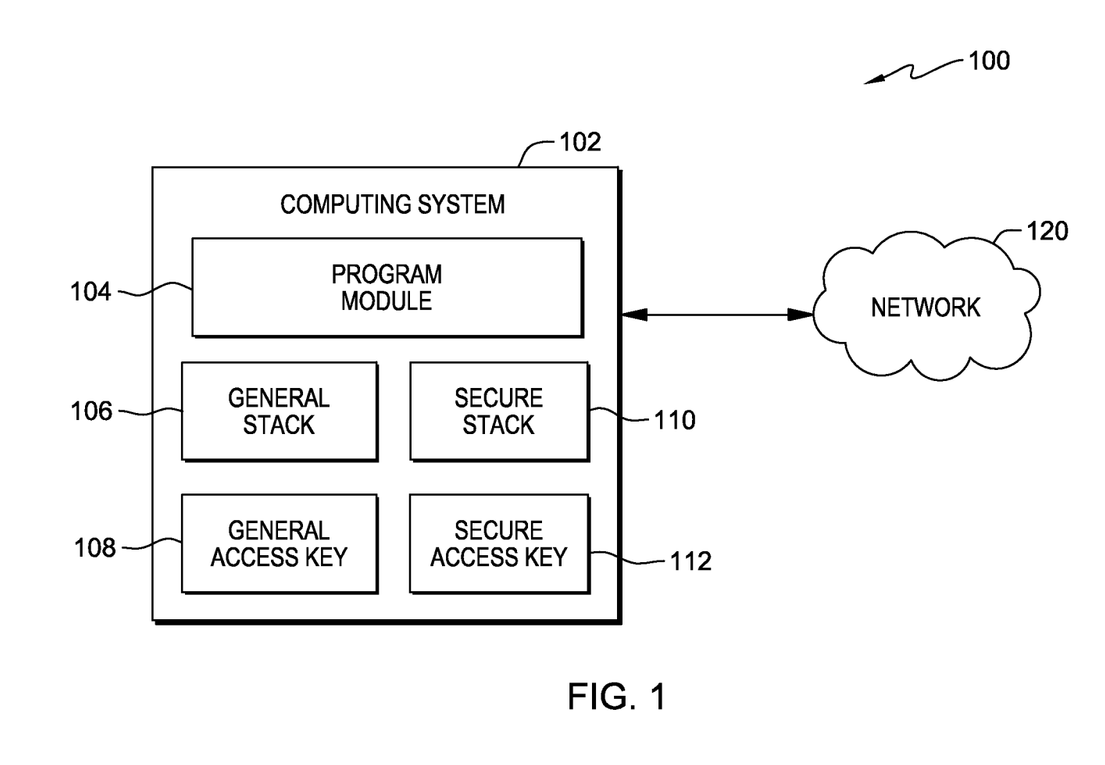
FIG. 1 is a functional block diagram illustrating a computing environment, in accordance with an embodiment of the present invention.

FIG. 1 is a functional block diagram illustrating a computing environment, generally designated 100, in accordance with an embodiment of the present disclosure.

Computing environment 100 includes computing system 102, which is connected to network 120. Computing system 102 may be a laptop computer, a tablet computer, a netbook computer, a personal computer (PC), a desktop computer, a personal digital assistant (PDA), a smart phone, or any programmable electronic device capable of communicating via network 120. In other embodiments, computing system 102 may represent a server computing system utilizing multiple computers as a server system, such as in a cloud computing environment. In another embodiment, computing system 102 represents a computing system utilizing clustered computers and components to act as a single pool of seamless resources. In general, computing system 102 is representative of any programmable electronic device or combination of programmable electronic devices capable of executing machine-readable program instructions and communicating with other computing devices via a network.

Figure 4:
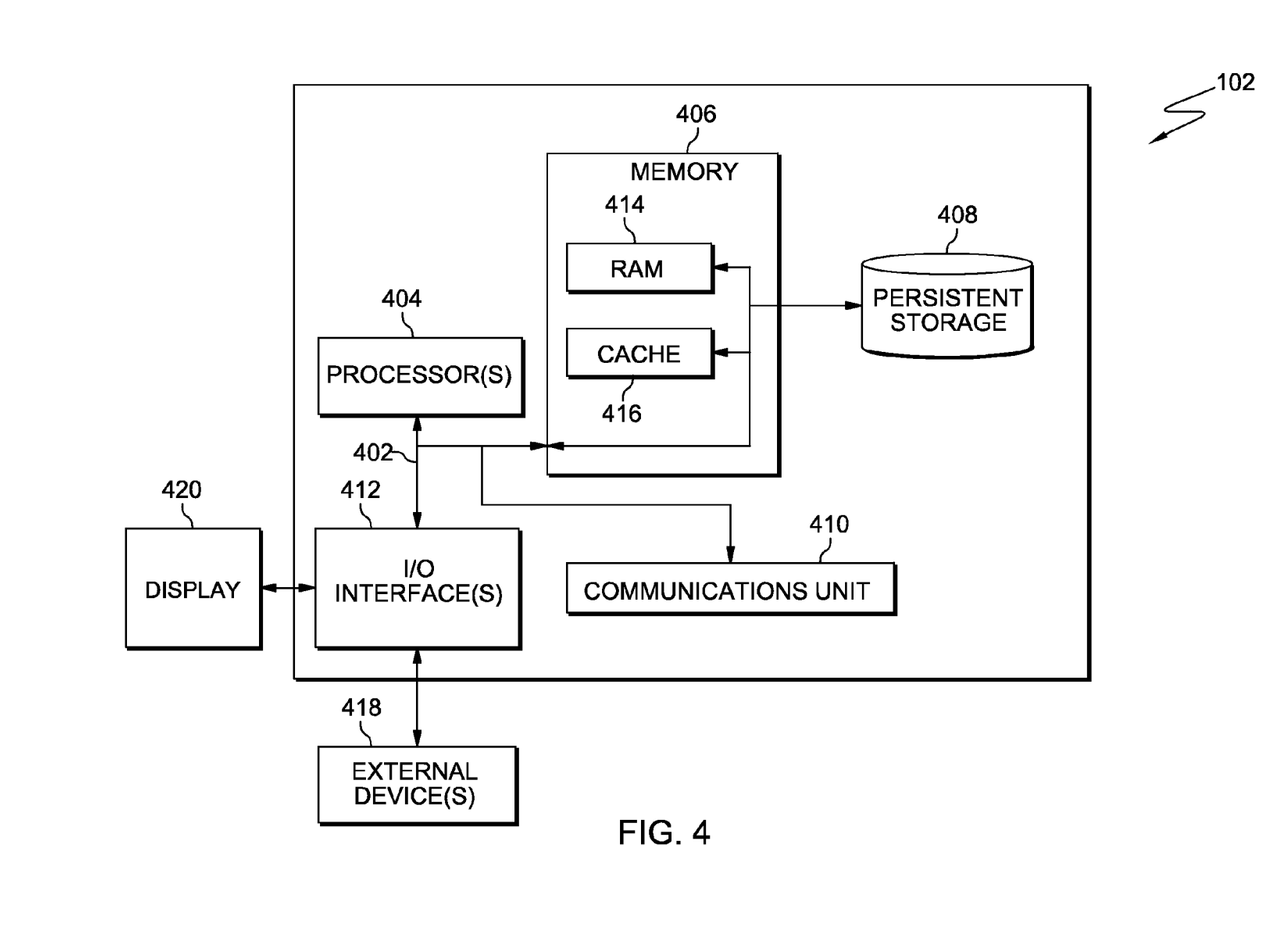
FIG. 4 depicts a block diagram of components of the computing system executing the program module, in accordance with an embodiment of the present invention.

Computing system 102 may include internal and external hardware components, as depicted and described in further detail with respect to FIG. 4.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications with server computer 102.

Embodiments of the present disclosure provide for initializing and managing multiple stacks, wherein the stacks correspond to at least one executable process. Further, each computer process can perform a function call, each of which may result in the addition of one or more executable items to a stack. A stack is a data structure that orders executable items of executable processes (e.g., subroutines). Executable items include memory addresses (e.g., return addresses), arguments, variables, or other data structures. Each stack is associated with at least one computer processor which manages the stack and executes subroutines using the executable items. Embodiments of the present disclosure further provide for classifying the executable items into a class corresponding to at least one of the stacks.

Program module 104 operates to protect against stack overflow events. In one embodiment, program module 104 protects against stack overflow by initializing and maintaining general stack 106 for extendable execution items and secure stack 110 for non-extendable execution items. In another embodiment, general stack 106 may include extendable and non-extendable execution items. In one embodiment, a non-extendable execution item comprises a data structure with a fixed size. An example of a non-extendable execution item is a return address, which identifies a memory address at which to resume operation of the program after completion of a calling function. Another example of a non-extendable execution item is an integer in the C++ programming language, which, in one implementation, is fixed at 4 bytes in size. In one embodiment, an extendable execution item comprises a data structure with a variable size. Examples of an extendable execution item include a vector, an array, another dynamically-sized data structure, or a data structure comprising a plurality of data elements accessed by an index.

Computing system 102 includes program module 104, general stack 106, general access key 108, secure stack 110, and secure access key 112. In computing environment 100, general stack 106 is associated with general access key 108 and secure stack 110 is associated with secure access key 112. In one embodiment, general access key 108 and secure access key 112 each represent a unique authentication key comprising a series of characters.

Program module 104 executes a command corresponding to general stack 106 or secure stack 110. In one embodiment, the command includes user input received from a client device. In one embodiment, the command comprises an access key, which is an authentication key comprising a series of characters. The access key may match general access key 108 or secure access key 112. Program module 104 validates the access key of the command in order to authenticate access to general stack 106 and secure stack 110.

In one embodiment, program module 104 resides on computing system 102. In other embodiments, program module 104 may reside on another computing system or another computing device, provided that program module 104 is accessible to, and can access, general stack 106, general access key 108, secure stack 110, and secure access key 112. Program module 104 is discussed in more detail in connection with FIGS. 2 and 3.

In one embodiment, general stack 106, general access key 108, secure stack 110, and secure access key 112 each reside on computing system 102. In other embodiments, general stack 106, general access key 108, secure stack 110, and secure access key 112 each reside on another computing system or another computing device, provided that each is accessible by program module 104. In another embodiment, general access key 108 and secure access key 112 reside in a repository, which may be protected by additional layers of authentication or access control. General stack 106, general access key 108, secure stack 110, and secure access key 112 are each discussed in more detail in connection with FIGS. 2 and 3.

Figure 2:
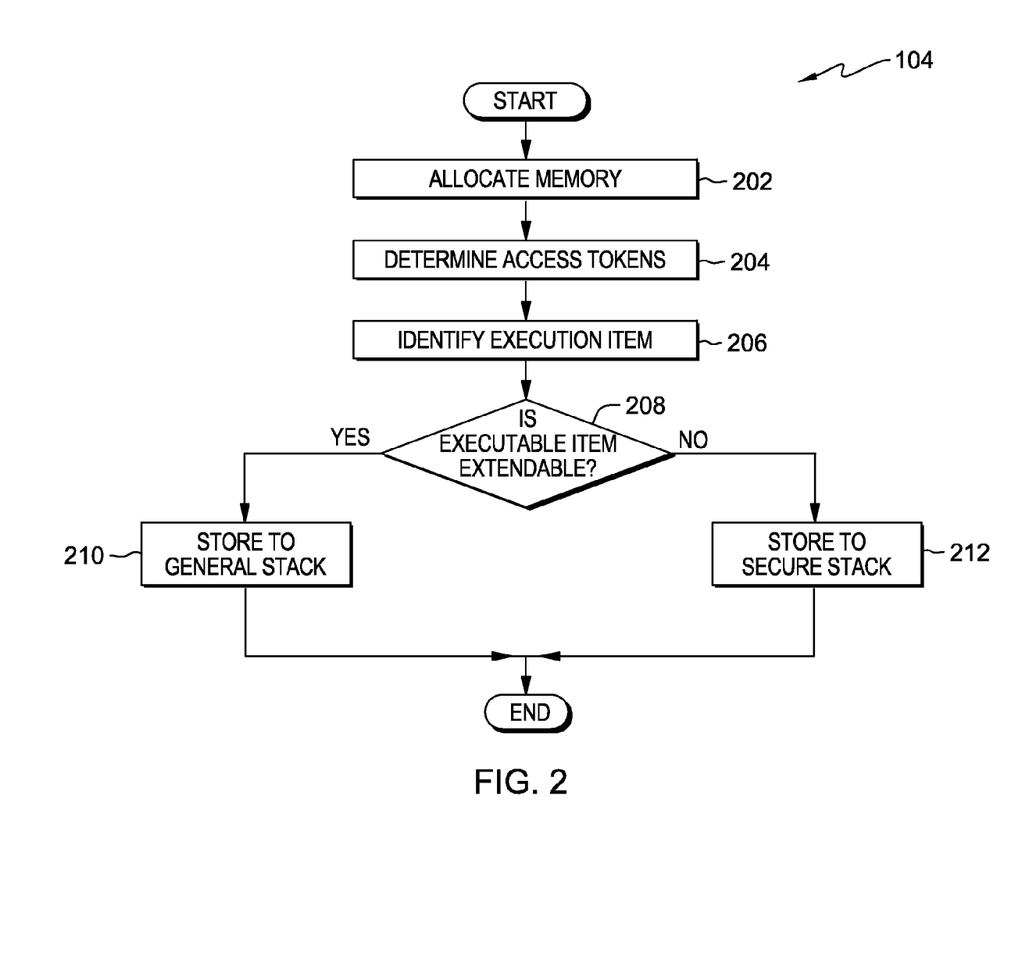
FIG. 2 is a flowchart depicting operational steps of a program module, on a computing system 102 within the computing environment of FIG. 1, for executing a process with stack overflow protection, in accordance with an embodiment of the present invention.

FIG. 2 is a flowchart depicting operational steps of program module 104, on computing system 102 within the computing environment of FIG. 1, for program execution with stack overflow protection, in accordance with an embodiment of the present disclosure.

In step 202, program module 104 allocates memory. Allocating memory means reserving a portion of a computer memory to store a particular data structure. In one embodiment, program module 104 allocates memory for general stack 106 and secure stack 110. For example, program module 104 may allocate memory in a first memory location for general stack 106 and in a second memory location for secure stack 110. In one example, the first and second memory locations are non-adjacent. In an alternate example, the first and second memory locations are adjacent and any additional allocations to expand the allocations at the first and second memory locations occur in opposite directions. In one embodiment, program module 104 stores a reference to the memory locations of general stack 106 and secure stack 110.

In step 204, program module 104 determines general access key 108 and secure access key 112. In one embodiment, program module 104 determines general access key 108 and secure access key 112 by generating an authentication key for each. For example, program module 104 may determine each of general access key 108 and secure access key 112 by generating a series of random characters. In another embodiment, program module 104 receives each of general access key 108 and secure access key 112, for example as user input from a client device. In yet another embodiment, general access key 108 and secure access key 112 are each pre-determined.

In step 206, program module 104 identifies an execution item. In one embodiment, program module 104 identifies an execution item by classifying the execution item. For example, program module 104 may classify the execution item into an extendable class or a non-extendable class. The execution item is associated with a function call. A single function call may result in the generation of one or more execution items. In one embodiment, the execution item comprises a return address. In another embodiment, the execution item comprises one or more data structures. For example, the execution item may comprise a parameter or argument of the function call and/or a return value of the function call.

In decision 208, program module 104 determines whether the execution item is extendable. In one embodiment, program module 104 determines whether the execution item is extendable based on whether the execution item comprises a data structure of variable size. In another embodiment, program module 104 determines whether the execution item is extendable based on whether the execution item is classified into an extendable class. For example, a vector in the C programming language and a string in the C++ programming language are each data structures of variable size. As another example, the execution item may comprise a data structure which includes a second data structure of variable size, such as a user-defined data structure. If program module 104 determines that the execution item is extendable (decision 208, YES branch), then program module 104 stores the execution item to the general stack (step 210). If program module 104 determines that the execution item is not extendable (decision 208, NO branch), then program module 104 stores the execution item to the secure stack (step 212). In some embodiments, program module 104 performs step 206, decision 208, and step 210 or 212 for each execution item.

Figure 3:
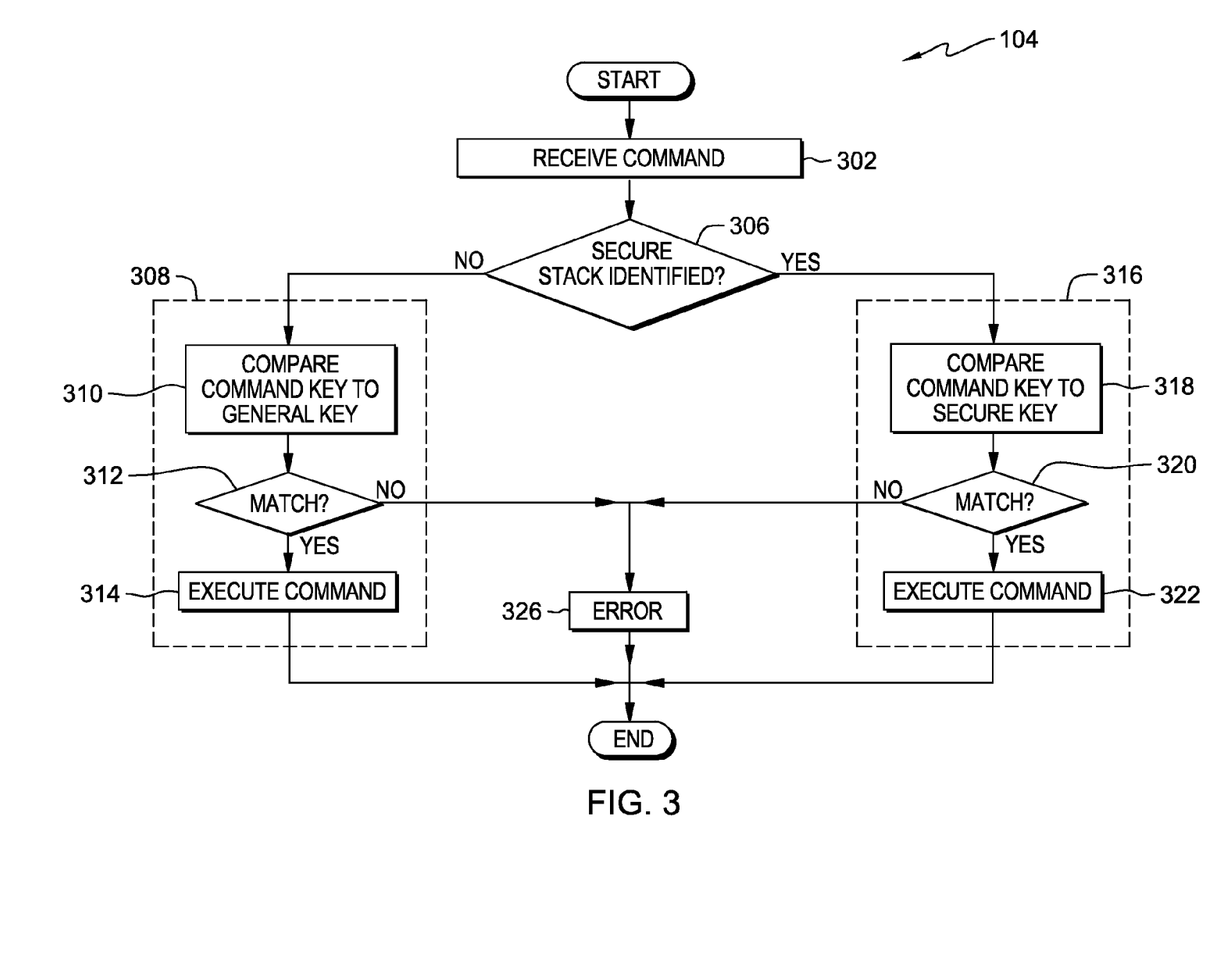
FIG. 3 is a flowchart depicting the operational steps of a program module executing a command with stack overflow protection, in accordance with an embodiment of the present invention.

FIG. 3 is a flowchart depicting an illustrative embodiment of operational steps of program module 104 executing a command with stack overflow protection, in accordance with an embodiment of the present disclosure.

Initially, program module 104 performs the operations depicted in FIG. 2. Thus, general stack 106 and secure stack 110 are allocated, general stack 106 is associated with general access key 108, and secure stack 110 is associated with secure access key 112.

In step 302, program module 104 receives a command. The command identifies an operation and a stack (e.g., general stack 108 or secure stack 112). For example, the command may identify a write operation, in which case the command comprises data to be written. As another example, the command may identify a read operation, in which case the command comprises a destination (e.g., a memory address) to which to write the requested data. In another embodiment, the command further comprises a command key. In yet another embodiment, the command further identifies a portion of the associated stack on which to perform the operation, such as by identifying a memory offset relative to the memory address at which the identified stack is stored.

In decision 306, program module 104 determines whether the command identifies secure stack 112. In one embodiment, the command identifies either general stack 108 or secure stack 112. If program module 104 determines that the command does not identify the secure stack (decision 306, NO branch), then program module 104 processes the command via general stack path 308. If program module 104 determines that the command identifies the secure stack (decision 306, YES branch), then program module 104 processes the command via secure stack path 316.

General stack path 308 comprises step 310, decision 312, and step 314. In step 310, program module 104 compares the command key to general access key 108. In various embodiments, the operations of general stack path 308 may be performed entirely by hardware, entirely by software, or by a combination of software and hardware.

In decision 312, program module 104 determines whether the command key matches general access key 108. If program module 104 determines that the command key does not match general access key 108 (decision 312, NO branch), then program module 104 encounters an error (step 326, discussed below). If program module 104 determines that the command key matches general access key 108 (decision 312, YES branch), then program module 104 executes the command (step 314).

Secure stack path 316 comprises step 318, decision 320, and step 322. In step 318, program module 104 compares the command key to secure access key 112. In various embodiments, the operations of general stack path 308 may be performed entirely by hardware, entirely by software, or by a combination of software and hardware.

In decision 320, program module 104 determines whether the command key matches secure access key 112. If program module 104 determines that the command key does not match secure access key 112 (decision 320, NO branch), then program module 104 encounters an error (step 326, discussed below). If program module 104 determines that the command key matches the secure access key (decision 320, YES branch), then program module 104 executes the command (step 322).

In step 326, program module 104 encounters an error. In one embodiment, program module 104 generates an exception in response to encountering an error. In another embodiment, program module 104 ceases operation in response to encountering an error. For example, program module 104 may terminate itself in an event which may be referred to as a program crash. In yet another embodiment, program module 104 returns an error message to a client device. For example, the error message may identify the command, the stack associated with the command, and the command key.

Some embodiments of the present disclosure are implemented without general access key 108 or secure access key 112. In such embodiments, program module 104 does not perform the operations of steps 204 of FIG. 2 or steps 310, 318 and decisions 312 and 320 of FIG. 3.

FIG. 4 depicts a block diagram of components of computing system 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing system 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Program module 104, general stack 106, secure stack 110, general access key 108, and secure access key 112 are stored in persistent storage 408 for execution and/or access by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program module 104, general stack 106, secure stack 110, general access key 108, and secure access key 112 may be downloaded to persistent storage 408 through communications unit 410.

I/O interface(s) 412 allows for input and output of data with other devices that may be connected to computing system 102. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present disclosure, e.g., program module 104, general stack 106, secure stack 110, general access key 108, and secure access key 112, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for protecting against stack overflow events, the method comprising:
   receiving, at a computer processor, a plurality of execution items corresponding to the computer process; and
   allocating a plurality of memory portions, wherein the plurality of memory portions includes: (i) a first memory portion corresponding to a first stack, the first stack corresponding to a first class of execution items, and the first stack being associated with a first access key; and
   (ii) a second memory portion corresponding to a second stack, the second stack corresponding to a second class of execution items, and the second stack being associated with a second access key,
   wherein the first class corresponds to extendable data types and the second class corresponds to non-extendable data types.

2. The method of claim 1, the method further comprising:
   identifying, by the computer processor, a first execution item of the plurality of execution items;
   determining, by the computer processor, that the first execution item corresponds to the first class; and
   storing, by the computer processor, the first execution item to the first stack.

3. The method of claim 1, the method further comprising:
- identifying, by the computer processor, a first execution item of the plurality of execution items;
- determining, by the computer processor, that the first execution item corresponds to the second class; and
- storing, by the computer processor, the first execution item to the second stack.

4. The method of claim 1, wherein each memory portion of the plurality of memory portions corresponds to a memory stack associated with an access key.

5. The method of claim 2, the method further comprising:
- storing, by the computer processor, the first execution item to the first stack based, at least in part, on a determination that (i) a first execution item of the plurality of execution items corresponds to the first class and (ii) the first execution item includes a key that corresponds to the access key of the first memory portion.

6. The method of claim 3, the method further comprising:
- storing, by the computer processor, the first execution item to the second stack based, at least in part, on a determination that (i) a first execution item of the plurality of execution items corresponds to the second class and (ii) the first execution item includes a key that corresponds to the access key of the second memory portion.

7. The method of claim 4, the method further comprising:
- receiving, by the computer processor, one or more instructions, wherein the one or more instructions include a command key, and wherein the one or more instructions identify one of the first stack and the second stack; and
- determining, by the computer processor, that the command key does not match the access key of the stack identified by the command key and, in response, generating an error message.

* * * * *